(12) United States Patent
Fike et al.

(10) Patent No.: US 8,272,861 B1
(45) Date of Patent: Sep. 25, 2012

(54) APPARATUS FOR VULCANIZING AT LEAST A TREAD OF A TIRE

(75) Inventors: Louis T. Fike, Hacienda Heights, CA (US); Frank Slopko, Victorville, CA (US); John Fike, Chino Hills, CA (US)

(73) Assignee: Titan International, Inc., Quincy, IL (US)

( * ) Notice: Subject to any disclaimer, the term of this patent is extended or adjusted under 35 U.S.C. 154(b) by 0 days.

(21) Appl. No.: 13/104,340

(22) Filed: May 10, 2011

(51) Int. Cl.
*B29C 33/28* (2006.01)

(52) U.S. Cl. .......................................... 425/47; 425/25
(58) Field of Classification Search .................. 425/25, 425/47

See application file for complete search history.

(56) References Cited

U.S. PATENT DOCUMENTS

| | | | | |
|---|---|---|---|---|
| 1,870,255 A | * | 8/1932 | Krause et al. | 425/47 |
| 2,000,406 A | * | 5/1935 | Michelson | 425/47 |
| 2,020,669 A | * | 11/1935 | Williams | 425/47 |
| 2,745,137 A | * | 5/1956 | Glynn | 425/47 |
| 3,154,814 A | | 11/1964 | Fike | |
| 3,697,206 A | * | 10/1972 | Bonazzi | 425/20 |
| 4,270,887 A | | 6/1981 | Tsang et al. | |
| 4,274,820 A | | 6/1981 | Fike | |
| 6,632,393 B2 | | 10/2003 | Fike | |
| 6,716,013 B2 | | 4/2004 | Fike | |

* cited by examiner

*Primary Examiner* — James Mackey
(74) *Attorney, Agent, or Firm* — Davis Brown Law Firm; Emily Harris

(57) ABSTRACT

An apparatus for vulcanizing at least a tread of a tire has a top mold section and a bottom mold section. The mold sections are secured to one another during a vulcanizing process by a plurality of locking mechanisms located around the outer circumference of the apparatus. Each locking mechanism includes a dual action hydraulic actuator. A piston rod of the hydraulic actuator imparts movement to a generally vertically oriented articulated linkage member. T-shaped projection located at an end of the articulated linkage member distal from the piston rod is brought into engagement with a securing member associated with the top mold section to secure the mold sections to one another. After the vulcanizing process is complete the hydraulic actuator imparts movement to the articulated linkage member to release the top mold section from the bottom mold section.

15 Claims, 13 Drawing Sheets

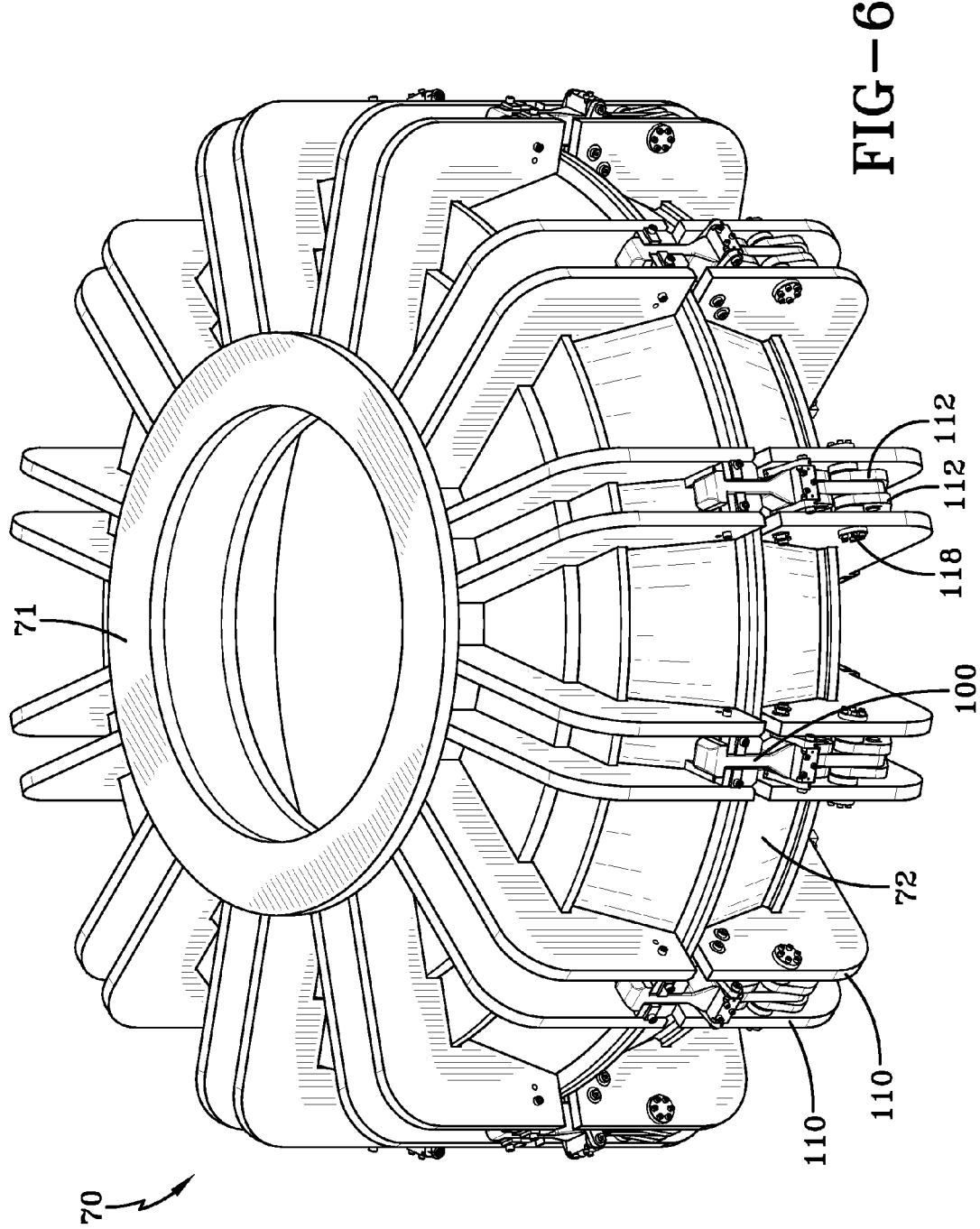

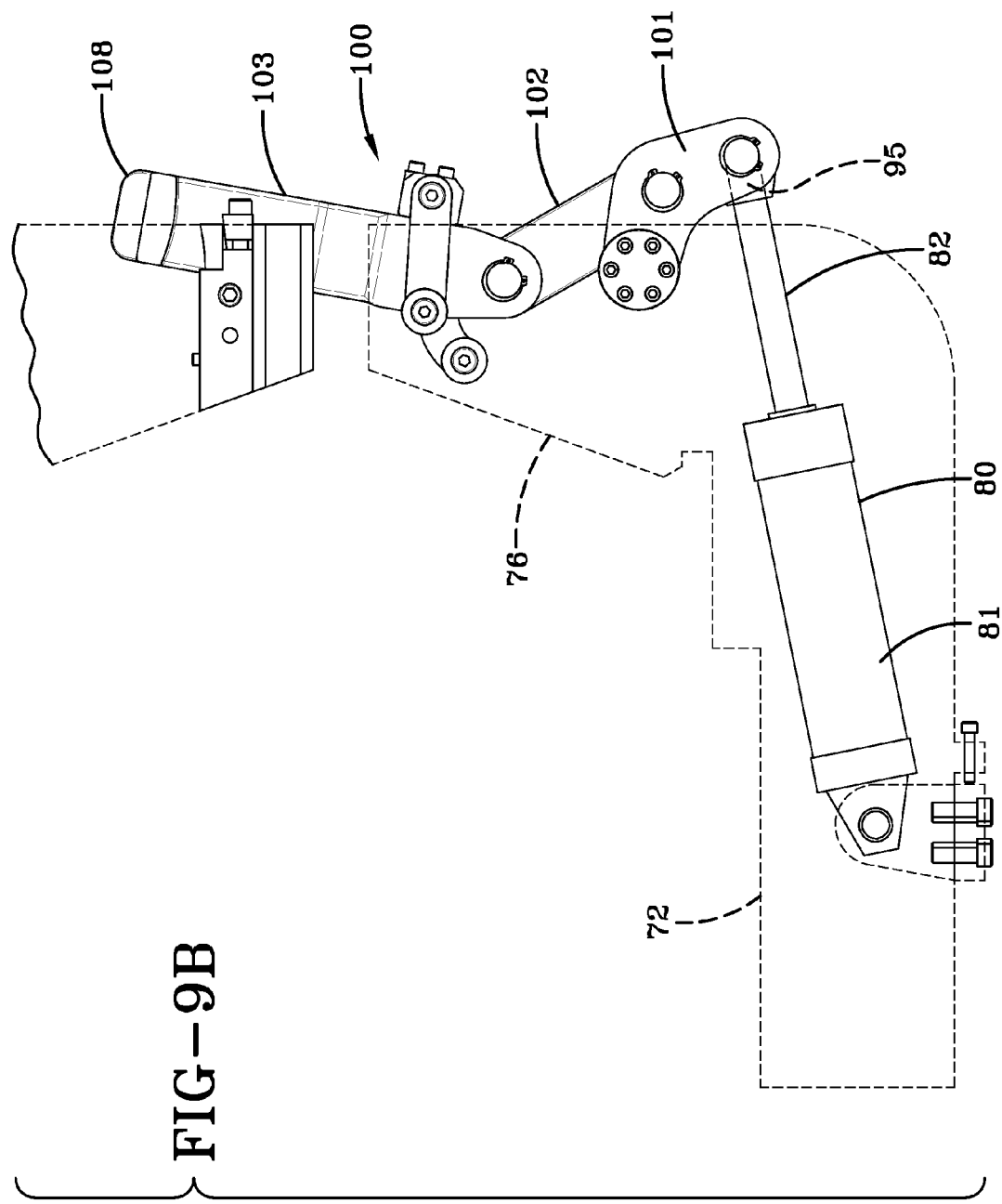

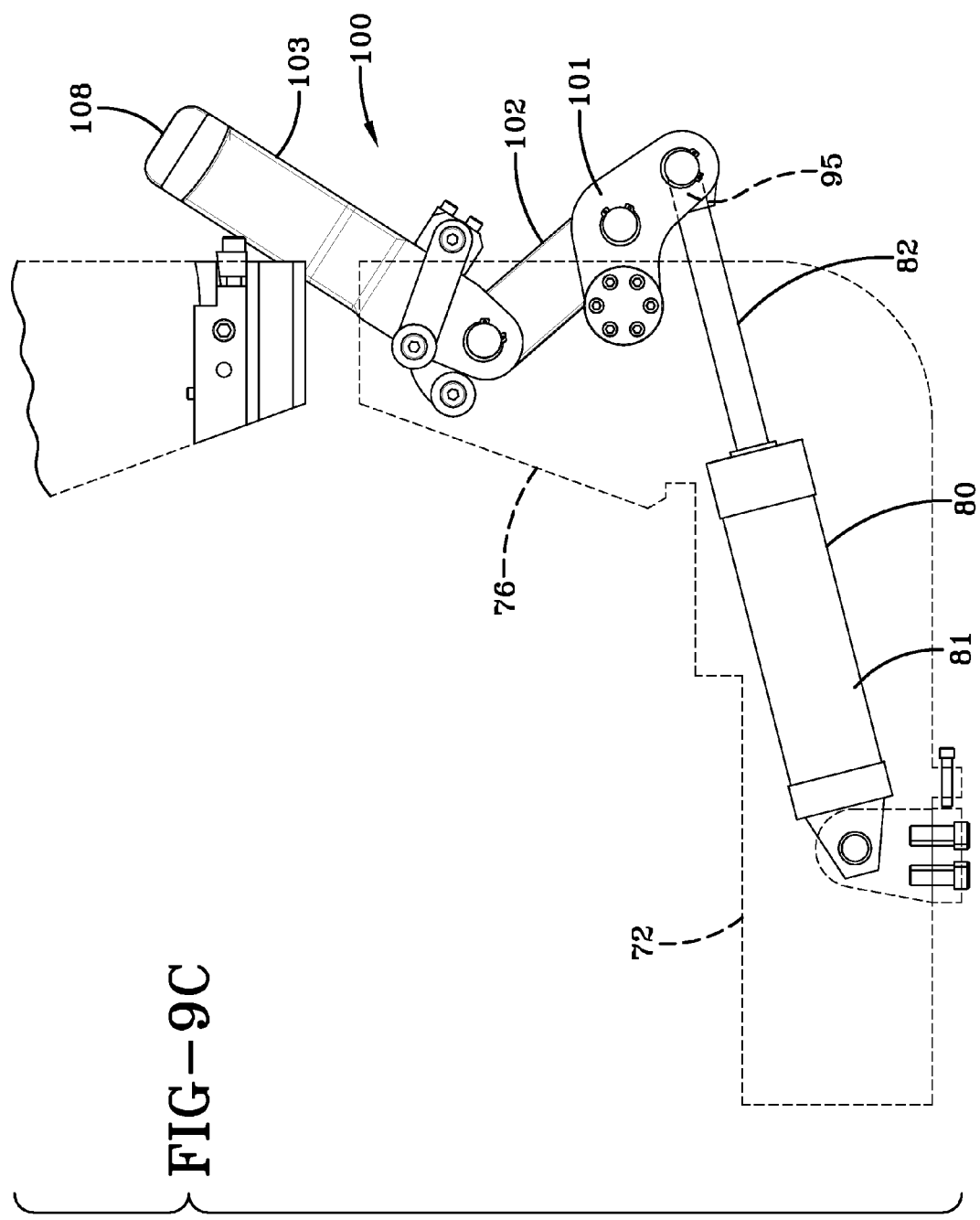

APPARATUS FOR VULCANIZING AT LEAST A TREAD OF A TIRE

FIELD OF THE INVENTION

The present invention relates to a mold and a vulcanization apparatus for vulcanizing a new tire or a tread of a retreaded tire.

BACKGROUND OF THE INVENTION

The rubber polymer of a pneumatic tire is vulcanized by placing a newly constructed tire in a mold and applying heat and pressure to cause the rubber polymer to be vulcanized and assume a desired shape and design by pressing the tire against the mold. Tires are most usually vulcanized with the axis of rotation of the tire extending vertically, such that a tire mold has mating upper and lower portions that form the bead and sidewall regions of the tire, with both the upper and lower mold portions forming a part of the ground engaging tread region of the tire. While smaller tire molds may be used with a clam shell type of vulcanization press, very large tires for farm equipment, earthmoving equipment and similar applications have the upper and lower portions of the tire mold configured as separate units that are assembled with one another by placing a new or retreaded tire in the lower portion of the mold, then mating the upper portion of the mold to the lower portion using a crane or hoist. In such an operation the fixing of the upper and lower mold portions to one another can be very time consuming and labor intensive, which has a negative effects on efficiency and cost of production. The present invention provides an apparatus and method for improving the efficiency and reducing the cost of vulcanization of very large new or retreaded tires.

DISCUSSION OF THE PRIOR ART

U.S. Pat. No. 6,632,393 B2 teaches a method and apparatus for vulcanizing large radial pneumatic tires in a segmental mold in a conventional autoclave without deforming the cords of the belt package relative to the unvulcanized rubber of the tire. U.S. Pat. No. 6,716,013 B2 teaches a tear resistant shield that can be used with the tire mold of U.S. Pat. No. 6,632,393 B2 to overcome damage to mold components due to friction between those mold components. Such a mold may be employed in the practice of the invention disclosed herein.

U.S. Pat. No. 3,154,814 A and U.S. Pat. No. 4,270,887 A teach a prior art means of securing upper and lower mold sections to one another using swing bolts and nuts, but this arrangement is very labor intensive and subject to non-uniform tightening of the nuts on the swing bolts.

U.S. Pat. No. 4,274,820 A teaches a quick release lock system for a tire vulcanizing apparatus. The apparatus includes a lower matrix that receives the lower part of a tire to be cured, and an upper matrix that receives the upper part of the tire to be cured. The upper matrix is vertically separable from the lower matrix to receive the tire. A plurality of lock arms are interposed between the upper and lower matrices to secure such matrices together during a tire curing operation. The tire cannot be inflated unless the lock arms are each firmly secured in place. However, under extreme pressure (as with swing bolts), this design proves to be an uneconomical solution to the problems of relieving centerline pressure when it is time to remove the tire from the mold. A need for a solution to this problem is a motivation for employing the invention disclosed herein.

SUMMARY OF THE INVENTION

There is provided in accordance with the present invention an apparatus for vulcanizing at least a tread of a tire. The apparatus includes a top mold section and a bottom mold section. The top mold section is vertically movable with respect to the bottom mold section from a raised open tire receiving position to a lower closed vulcanizing position. The top and bottom mold sections each having a circumferentially extending outer wall. A plurality of mechanisms are provided for locking the top mold section to the bottom mold section when the upper mold section is in the lower closed vulcanizing position. These mechanisms are spaced apart around the circumferentially extending outer walls of the top and bottom mold sections. The mechanisms for locking the top mold section to the bottom mold section each include a hydraulic actuator having a cylinder with a piston disposed within the cylinder. A piston rod has a first end fixed to the piston and extends through the cylinder to a second end located outside the cylinder. Each hydraulic actuator is disposed such that the cylinder is at least partially disposed below the bottom mold section with the piston rod aligned radially with respect to the bottom mold section. The second end of the piston rod is located radially outward of the circumferentially extending outer wall of the bottom mold section and is movable towards and away from the circumferentially extending outer wall of the bottom mold section. The second end of the piston rod is fixed to a first end of an articulated linkage member comprising a plurality of segments connected to one another in a pivotal manner. A vertically highest segment of the articulated linkage member has a T-shaped projection at a second end of the articulated linkage member. An adjustable securing mechanism is fixed to the circumferentially extending outer wall of the top mold section and is circumferentially aligned with the T-shaped locking projection. The adjustable securing mechanism has a slot therein that extends radially with respect to the top mold section for receiving the articulated linkage member with the T-shaped locking projection located above the slot. An upper surface of the adjustable securing mechanism has a concave surface disposed on each side of the slot for receiving a complementary surface of the T-shaped locking projection.

BRIEF DESCRIPTION OF THE DRAWINGS

FIG. 6 is a perspective view of an apparatus according to the present invention for vulcanizing at least the tread of a tire.

FIG. 9B is a side elevation view of the mechanism for locking a top mold section to a bottom mold section in a configuration where the top mold section is not locked to the bottom mold section. FIG. 9B shows the locking mechanism is either just about to complete the locking procedure or just beginning the unlocking procedure.

FIG. 9C is a side elevation view of the mechanism for locking a top mold section to a bottom mold section in a configuration where the top mold section is not locked to the bottom mold section. FIG. 9B shows the locking mechanism is either just beginning the locking procedure or completing the unlocking procedure.

DETAILED DESCRIPTION OF THE INVENTION

U.S. Pat. No. 6,632,393 B2 teaches a method and apparatus for vulcanizing large radial pneumatic tires in a segmental mold in a conventional autoclave without deforming the cords of the belt package relative to the unvulcanized rubber of the tire. In the tire manufacturing and retreading businesses, it is common to use the terms "cured" in place of vulcanized, "curing" in place of vulcanizing, and "green tire" in place of unvulcanized tire, so it is quite acceptable to find these synonymous terms used in prior art documents and in the present document interchangeably. U.S. Pat. No. 6,716,013 B2 teaches a tear resistant shield that can be used with the tire mold of U.S. Pat. No. 6,632,393 B2 to overcome damage to mold components due to friction between those mold components. U.S. Pat. No. 6,632,393 B2 and U.S. Pat. No. 6,716,013 B2 are each incorporated herein in its entirety for the purpose of teaching tire molds that may be used in the practice of the present invention.

Figure 1:
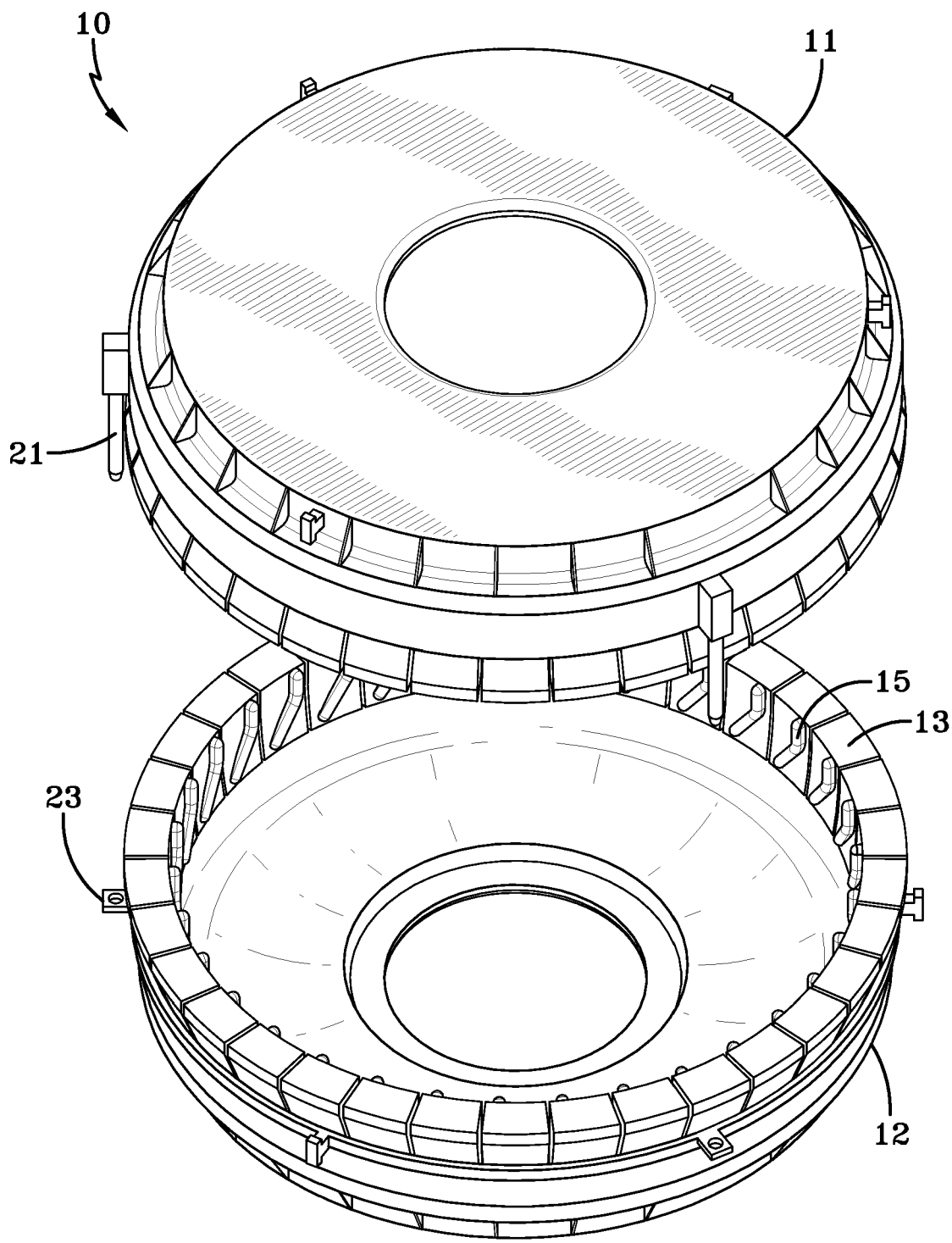
FIG. 1 is a perspective view of a prior art tire mold showing a top mold section in a raised open position with respect to a bottom mold section.
Figure 2:
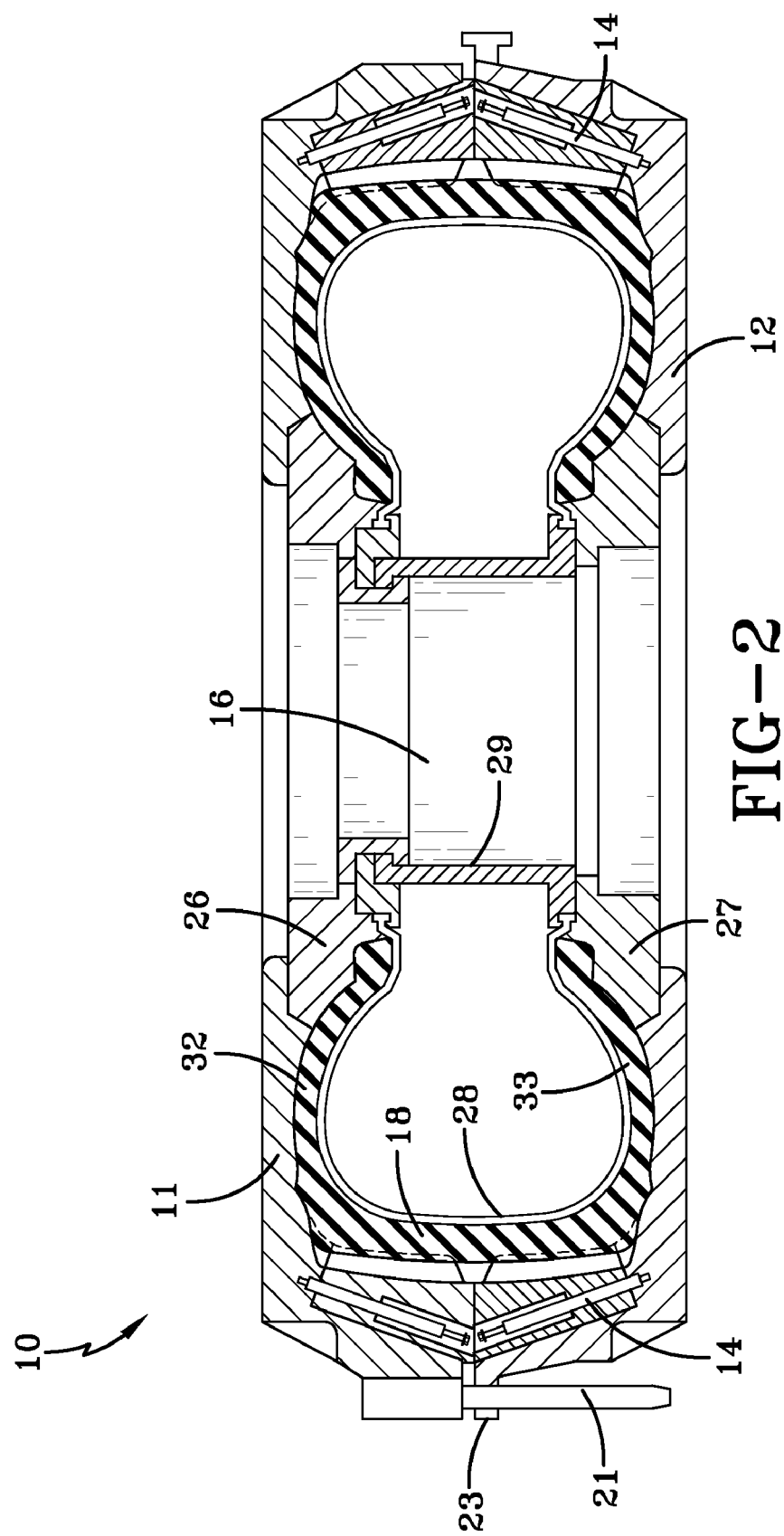
FIG. 2 is a cross section of the prior art tire mold of FIG. 1 showing the top mold section in a lowered position with respect to the bottom mold section, with the mold sections ready to be positioned within an autoclave to vulcanize a tire.

With reference to FIGS. 1 and 2, the segmental mold 10 taught in U.S. Pat. No. 6,632,393 B2 includes a top mold section 11 and a bottom mold section 12. As used herein and in the claims the terms, "top", "bottom", "upper", "lower", "above", "below", "up", "down" and other indications of vertical direction or location are understood to be used with referenced to the parts of a tire mold or tire vulcanizing apparatus when the tire mold or apparatus is in its operative configuration. The top mold section 11 is movable with respect to the bottom mold section 12 between a raised open position and a lower closed position. The top and bottom mold sections each contain a plurality of like tread segments 13 arranged in a circular pattern. Each tread segment is coupled to its associated mold section by a slanted guide rod 14 which allows the tread segment to slide. Two compression springs (not shown) are positioned on either side of each guide rod 14 to bias the tread segments outwardly with respect to the respective mold section. Each of the tread segments is formed with radially inwardly extending tread groove-defining lugs 15.

A newly assembled and unvulcanized tire, or a used tire having a replacement tread portion of unvulcanized rubber, is supported during the vulcanizing process by an annular tire carrier 16 having complimentary upper and lower bead rings 26, 27 with surfaces that conform to the shape of the bead and inner sidewall portions of a tire 18. A conventional inflatable bladder 28 is clamped between the bead rings and a vertically extending sleeve 29 that connects the bead rings 26, 27. The sleeve 29 is provided with a fluid inlet and outlet fitting (not shown) in a conventional manner.

The bottom mold section 12 is so configured that when the top mold section 11 is spaced apart from the top mold section, the tread segments 13 of the bottom mold section 12 are arranged radially outwardly of the outer diameter of an unvulcanized tire. When the top mold section 11 is moved to a lower position to engage the bottom mold section, the tread segments 13 of both the top and bottom mold sections are automatically moved radially inwardly so that the tread-defining lugs 15 of the tread segments engage the unvulcanized crown of the tire 18. As used herein and in the claims with respect to a tire, a tire mold, or a tire vulcanizing apparatus, the terms "radial" and "radially" are understood to refer to directions going towards or away from and perpendicular to the axis of rotation of a tire either when the tire is located in a mold or outside a mold. A plurality of guide bars 21 are located radially outwardly of the tread segments of the top mold section and extend vertically to extend through a bore in a flange 23 of the bottom mold section to provide a proper circumferential alignment of the top and bottom mold sections. When the vulcanizing process is completed the top mold section 11 is raised and the upper and lower tread segments 13 automatically move outwardly away from the vulcanized tire allowing the tire to be freely withdrawn from the bottom mold section 12 without the tread segments damaging the tire.

U.S. Pat. No. 6,632,393 B2 teaches that an unvulcanized tire 18 can be vulcanized in a mold without any deformation between the cords of the bead package and the unvulcanized rubber of the tire thereby precluding the formation of discontinuities between the cords and the unvulcanized rubber surrounding such cords. This feature is accomplished by extending the lower sidewall of the bottom mold section 12 substantially the entire distance from the tire bead area to the periphery of the tread portion of the unvulcanized tire 18. With this arrangement, the sidewalls 32, 33 of the tire are supported by the bottom mold section that provides a firm platform for the unvulcanized tire without causing a deformation of the belt package of the tire. The radially outer portion of the lower sidewall of the bottom mold section 12 is formed with auxiliary lugs that define the shoulder portions of the tread of a vulcanized tire. The lugs 15 of the tread segments 13 and the mold sidewall auxiliary lugs cooperate to form a complete tread pattern of a vulcanized tire.

Figure 3:
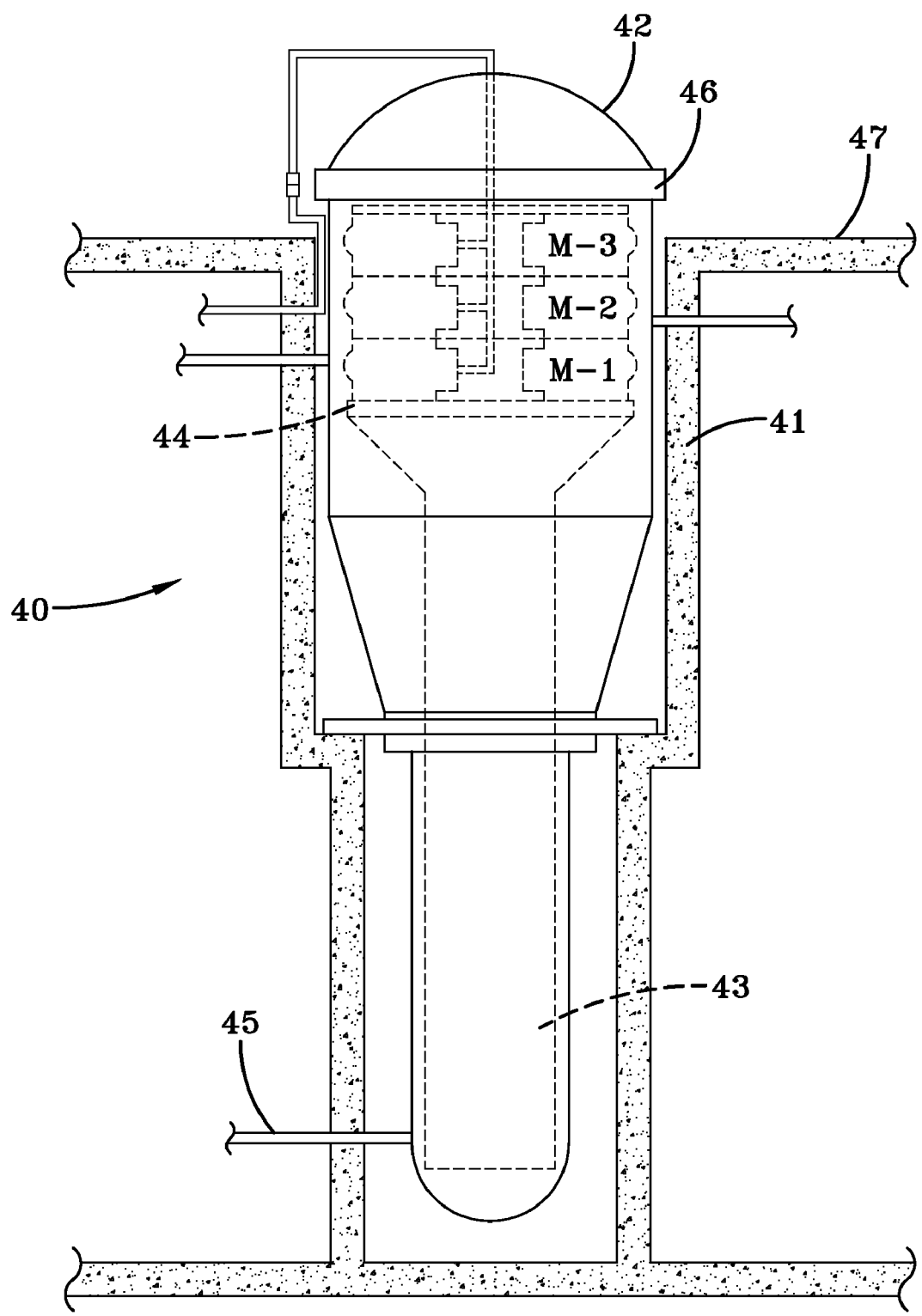
FIG. 3 is a schematic side elevation view of a prior art autoclave utilized to vulcanize at least the treads of tires disposed within a plurality of the prior art tire molds of FIGS. 1 and 2.

U.S. Pat. No. 6,632,393 B2 teaches that a plurality of the prior art molds each containing an unvulcanized tire may be arranged in a conventional autoclave for concurrent vulcanizing of the tires. Referring now to FIG. 3, there is shown a conventional autoclave 40 extending into a well below the floor 47 of a manufacturing facility. The autoclave has a heater shell 41 provided with a removable dome 42. A vertically movable fluid-actuated ram 43 arranged within the heater shell is provided at its upper end with a mold support platform 44. A pressurized liquid such as water for operating the ram is provided by piping 45 in a known manner. In FIG. 3 a plurality of the prior art molds, designated M-1, M-2 and M-3, have been positioned within the heater shell. The top mold section of the lowermost mold M-1 will be urged downwardly towards its closed position by the weight of the second mold M-2 as the latter is positioned upon mold M-1 within the autoclave 40. In a similar fashion the weight of the third mold M-3 will partially or completely close the top mold section of the second mold section when mold M-2 is lowered onto mold M-1 within the autoclave. Final closing of the molds M-1, M-2, and M-3 is effected, however, when the mold sections have been moved upwardly by the ram 43 until the top of the uppermost mold M-3 is moved into engagement with the bolster plate 46 formed on the bottom of the dome 42. The ram will then squeeze each of the mold sections tightly together under great pressure. After the tires have been vulcanized the molds are removed from the autoclave and the vulcanized tires withdrawn from their respective molds.

While conventional autoclaves are still in use, an alternative system of vulcanizing new tires and the treads of retreaded tires using free standing tire vulcanizing machines, that unlike conventional autoclaves are located entirely above the floor of a manufacturing facility and accommodate only a single tire vulcanizing mold. Therefore a new means for squeezing the upper and lower mold sections of a mold used for vulcanizing very large tires, wherein very high pressure is exerted on internal surface of the mold portions is needed.

Figure 5:
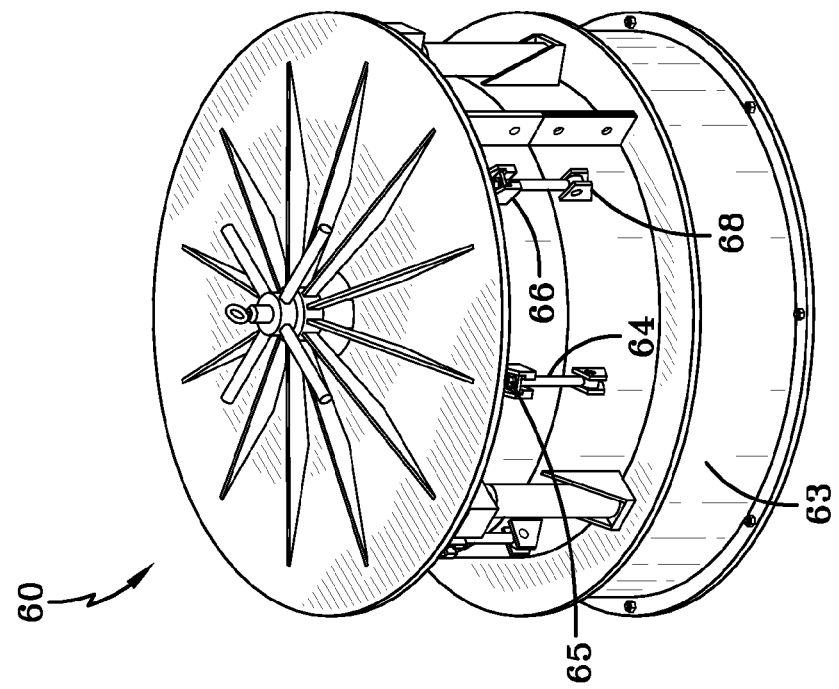
FIG. 5 is a perspective view of the prior art tire vulcanizing apparatus of FIG. 4 with the upper and lower mold sections secured to one another by the known means of securing the upper and lower mold sections of a tire mold to each other.
Figure 4:
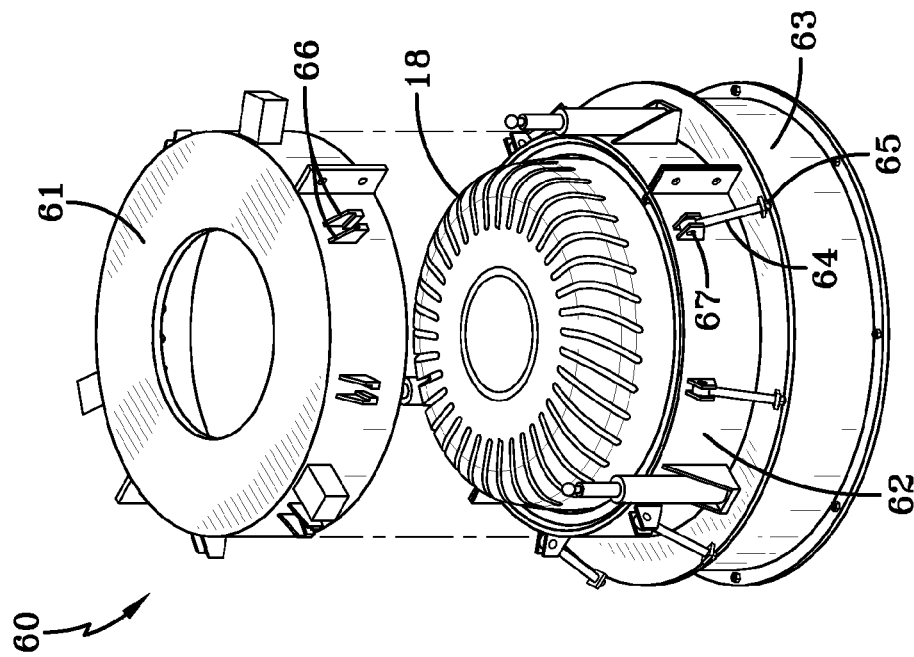
FIG. 4 is a perspective view of a prior art tire vulcanizing apparatus with the upper and lower mold sections spaced apart, the apparatus employing a known means of securing the upper and lower mold sections of a tire mold to each other.

One known means of securing upper and lower mold sections to one another is disclosed in U.S. Pat. No. 3,154,814 A, which is incorporated herein in its entirety for the purpose of teaching a prior art means of securing upper and lower mold sections to one another. FIG. 4 is a perspective view of the prior art tire vulcanizing apparatus 60 disclosed in U.S. Pat. No. 3,154,814 A with the upper 61 and lower 62 mold sections spaced apart. FIG. 5 shows the same tire vulcanizing apparatus 60 at another stage of the tire vulcanizing process with the upper and lower mold sections 61, 62 secured to one another by the known means of securing the upper and lower mold sections of a tire mold to each other.

A stand 63 rests on a floor of a manufacturing facility. The lower mold section 62 rests on the stand 63 and is secured in place with appropriate fixing means. It is understood that the upper and lower mold sections shown in FIGS. 4 and 5 may be replaced by the upper and lower mold sections disclosed in U.S. Pat. No. 6,632,393 B2 as described above. In FIGS. 4 and 5 the upper and lower mold sections are firmly secured together by means of a plurality of swing bolts 64 spaced around the perimeter of the lower mold section 62 and fastening nuts 65 with each of the fastening nuts tightened against one of a plurality of upper bracket members 66 spaced around the perimeter of the upper mold section 61. Each swing bolt is provided at one end with a through opening for pivotal mounting of the swing bolt on the lower mold section by means of a pin 67 that is attached to a pair of lower bracket members 68. The lower bracket members are welded to the circumferentially extending outer surface of the lower mold section. The free end of each swing bolt is formed with fastening threads for receiving a nut and fits within an upper bracket member fastened to the circumferentially extending outer surface of the upper mold section. Each of the upper and lower bracket members comprises a pair of oppositely disposed extending members.

After the upper mold section 61 is lowered into position adjacent the lower mold section 62 each swing bolt 64 must be pivoted upwardly and the associated nut 65 is rotated to tighten the nut against an upper bracket member 66 with sufficient torque to maintain the upper and lower mold sections in place during the vulcanization process. Heat and pressure needed for the vulcanization process is provided both inside the tire via a bladder and to the exterior of the tire via platens or steam chambers disposed in the structure of the upper and lower mold sections in a known manner. After the vulcanization process is complete each nut must be loosened to move away from the associated upper bracket member a sufficient distance that the swing bolt can be pivoted downwardly away from the upper mold section. After all of the nuts have been loosened and the swing bolts pivoted downwardly the upper mold section may be lifted upwardly and the vulcanized tire 18 may be removed from the lower mold section. It is understood that this system for securing the upper and lower mold sections to one another is employed for both the vulcanizing of newly manufactured tires and retreaded tires.

Figure 7:
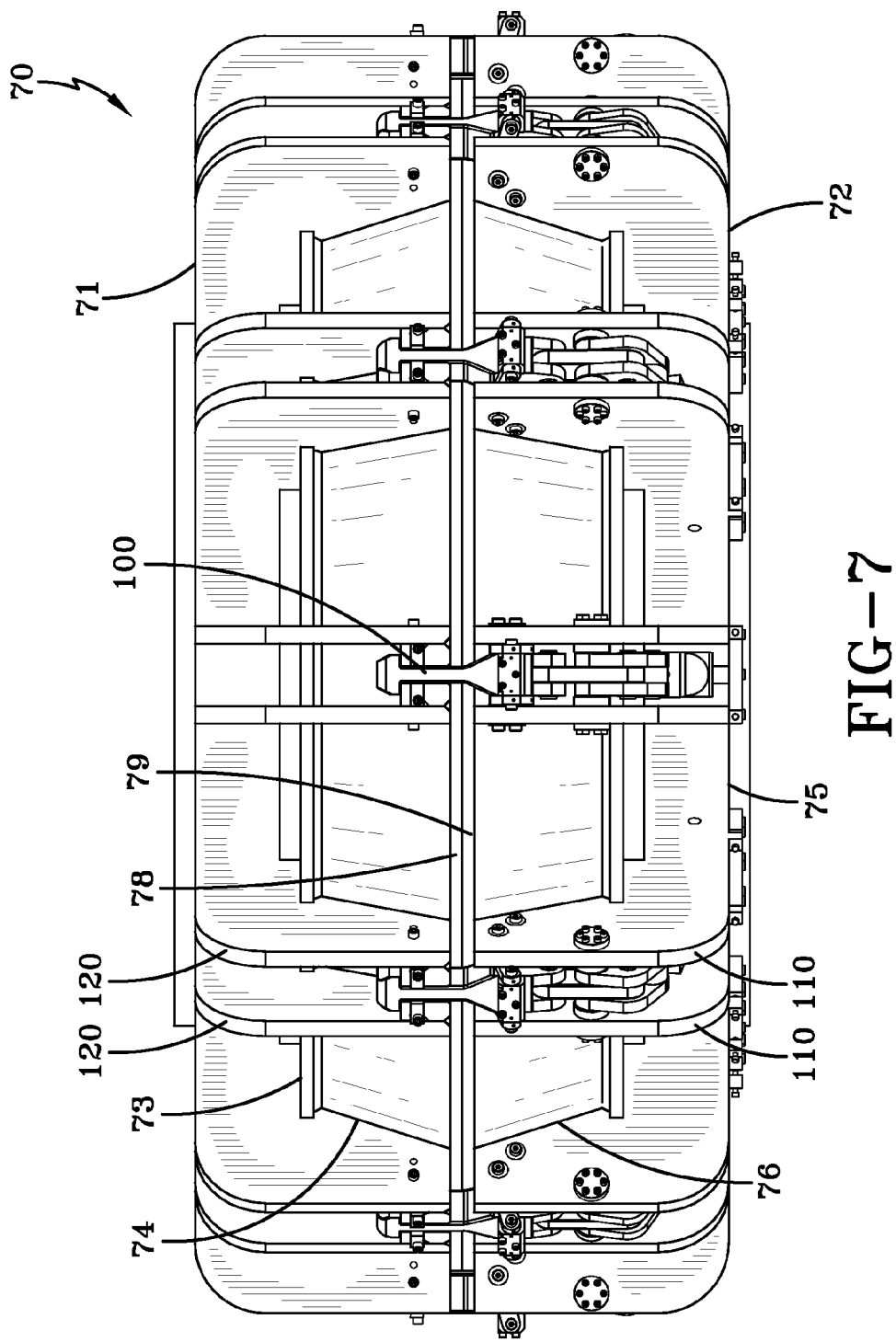
FIG. 7 is an elevation view of the apparatus of FIG. 6.

Referring now to FIGS. 6 and 7 there is presented a perspective view and an elevation view of an apparatus 70 according to the present invention for vulcanizing at least the tread of a tire. The apparatus includes a top mold section 71 and a bottom mold section 72. The top mold section has a top wall 73 and a circumferentially extending outer wall 74. The bottom mold section has a bottom wall 75 and a circumferentially extending outer wall 76. As used herein and in the claims it is understood that both the top and bottom mold sections may include on their interiors molding devices that form the tread and sidewall contours of a new tire, or tire tread of a tire that is being retreaded, that is to be vulcanized using the apparatus of the present invention. U.S. Pat. No. 6,632,393 B2, which has already been incorporated herein in its' entirety, teaches an example of such a molding device that may be employed in the practice of the present invention. However, it is to be understood that any appropriate molding device may be employed with the top and bottom mold sections of the apparatus disclosed herein. The top mold section is vertically movable with respect to the bottom mold section from a raised open tire receiving position to a lower closed vulcanizing position. When the top mold section is in a lower closed vulcanizing position circumferentially extending ledges 78, 79 of the top and bottom mold sections meet along a parting line. In FIGS. 6 and 7 the usual additional components of a tire vulcanizing apparatus, such as an annular tire carrier, bead shaping rings, an inflatable bladder, and a means for clamping the bladder in place have been omitted for clarity. However, examples of such components have been presented in FIG. 2, and are more fully described in U.S. Pat. No. 6,632,393 B2, which has already been incorporated herein in its' entirety. It is to be understood that the any appropriate design and arrangement of such components, selected in accordance with sound engineering practices, may be employed with an apparatus according to the present invention for vulcanizing at least the tread of a tire.

It is to be understood that an apparatus according to the present invention for vulcanizing at least the tread of a tire may be utilized with a stand for supporting the bottom mold section. An appropriate means for supplying heat for the vulcanization process and pressure inside the curing bladder, selected in accordance with sound engineering practices, may be employed with an apparatus according to the present invention for vulcanizing at least the tread of a tire. An example of such a stand for supporting the bottom mold section and means for supplying heat and pressure is disclosed herein in FIGS. 4 and 5 and in U.S. Pat. No. 3,154,814 A which has already been incorporated herein in its entirety.

The prior art method of securing of upper and lower mold sections using swing bolts and locking nuts during the vulcanizing of large earthmover or tractor tires is not without drawbacks. The locking nuts are difficult to tighten with equal torque around the perimeter of the mold, and the process is very labor intensive. Loosening of the locking nuts is even more difficult, labor intensive, and time consuming. The pressure inside a newly manufactured earthmover tire during the vulcanization process can be up to five hundred pounds per square inch. When the interior of the tire is pressurized by high pressure, the bolts or the frame of the apparatus may yield and be elongated, or the mold segments for the tread may become somewhat displaced, and a space may open up at the parting line where the top and bottom mold sections meet. While this phenomenon occurs during the vulcanizing of both new and retreaded tires, the very long time required to vulcanize a new large tire for earthmoving equipment can be up to about seventeen hours, and when the pressure inside the mold is released the bolts are still under tension because of flash at the mold parting line. It is estimated that the space may be up to 3/16 of an inch (0.19 inch) when very large tires for earthmoving equipment are vulcanized, and the resultant flash at the centerline of the tire tread is up to 1/4 inch (0.25 inch). During the vulcanizing process rubber is pushed between the mating surfaces of the upper and lower mold sections and is vulcanized so quickly that the rubber generally does not flow any further than about half way across the mold parting line.

As the rubber is vulcanized the rubber itself generates about seven hundred and fifty pounds per square inch of force between the upper and lower mold sections at the parting line. This is why it takes much more torque to loosen the fixing nuts after the tire is vulcanized, and why the operators of tire vulcanizing apparatuses tend to not tighten the molds too tight, which works against them since the flash at the centerline of the tire tread becomes thicker and flows further across the mold parting line. The result is a less efficient use of very expensive molds and tire vulcanizing equipment and wasted rubber that becomes flash to be trimmed. It is indeed an engineering challenge to provide an improved apparatus and method for securing upper and lower mold sections used in the vulcanization of very large new and retreaded tires that can improve manufacturing efficiency and reduce waste. An apparatus of the present invention for vulcanizing at least a tread of a tire addresses this engineering challenge by providing a plurality of novel mechanisms for locking the top mold section to the bottom mold section when the upper mold section is in the lower closed vulcanizing position.

Figure 8:
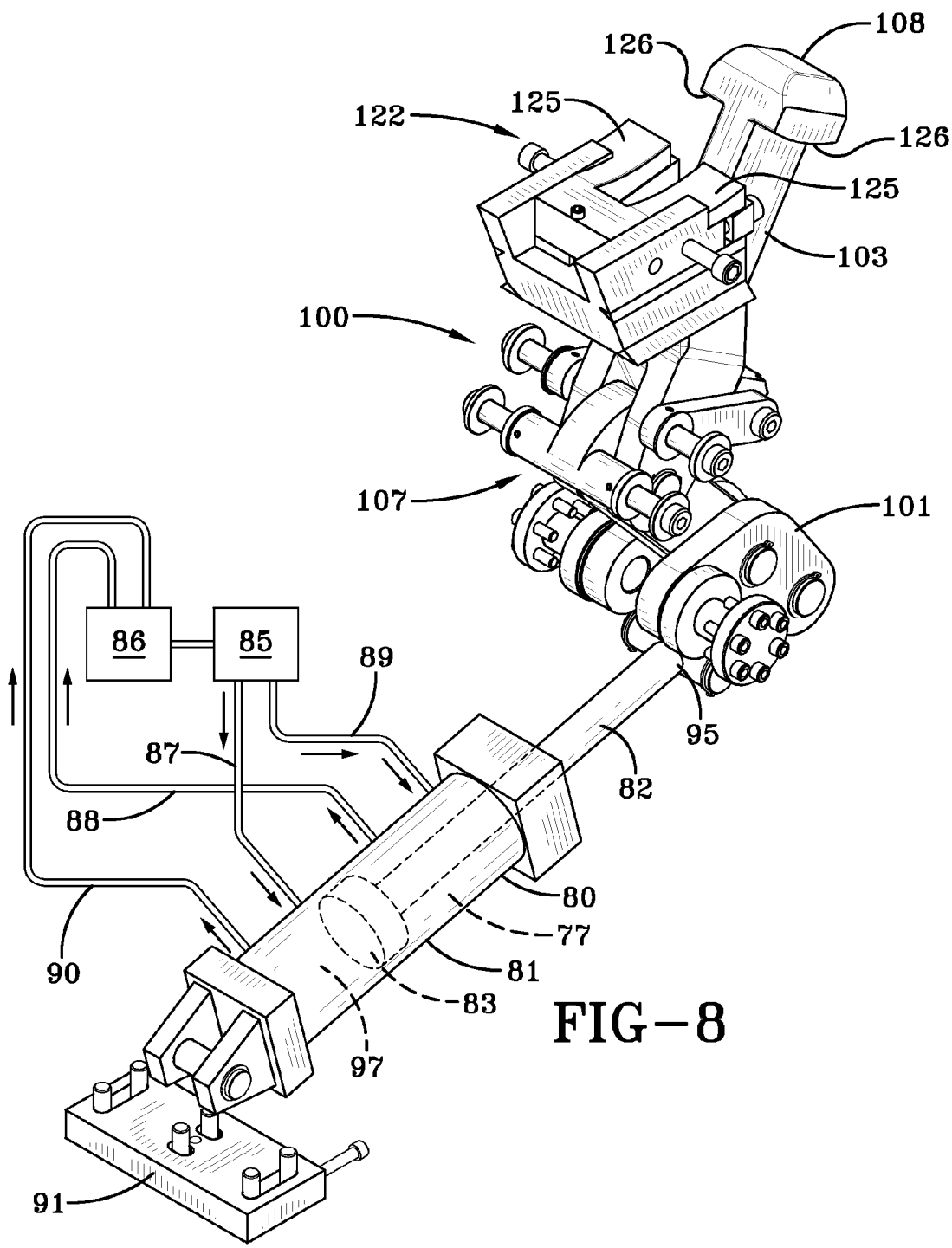
FIG. 8 is a perspective view of a portion of a mechanism for locking a top mold section to a bottom mold section in the apparatus of FIG. 6.
Figure 9A:
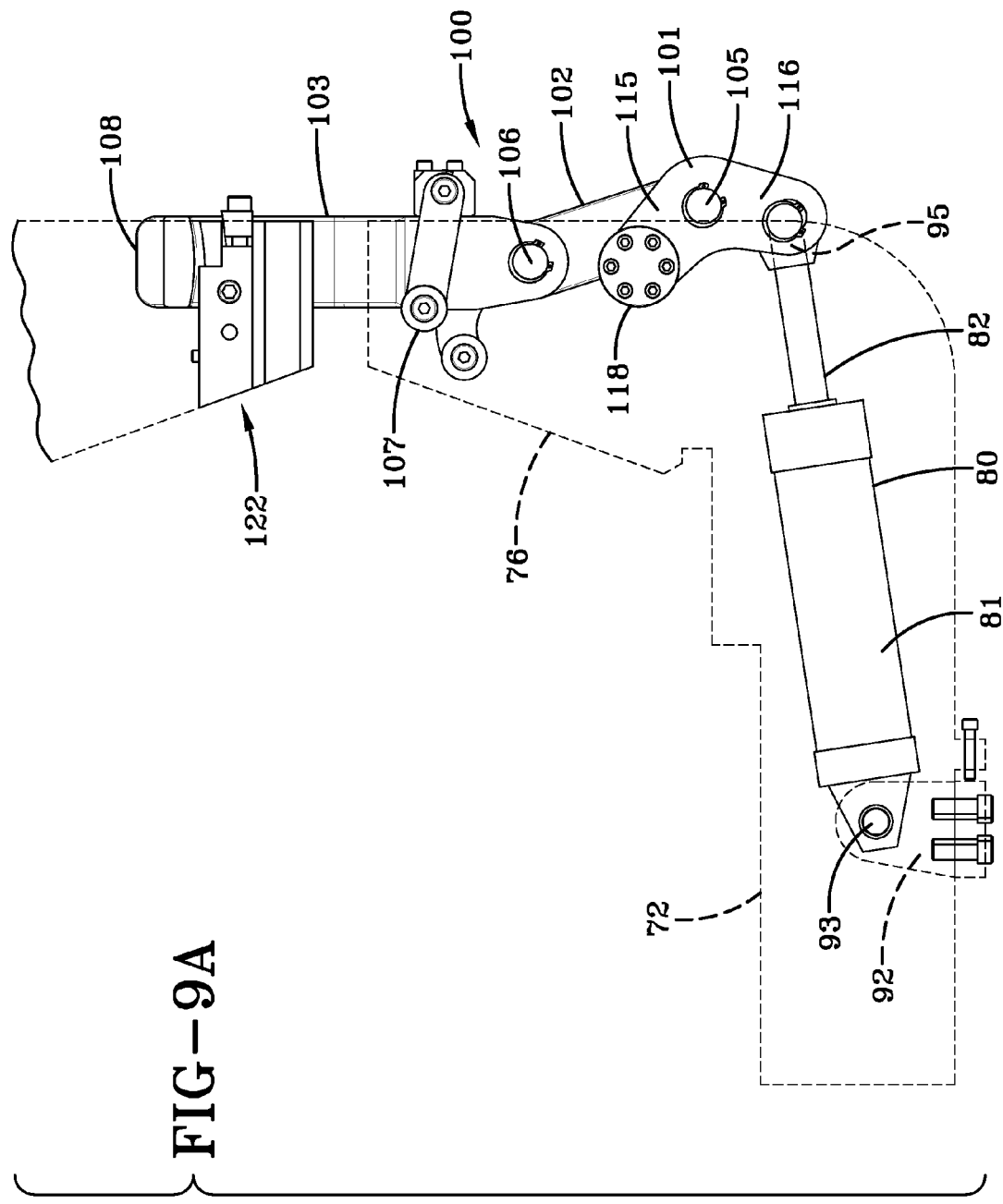
FIG. 9A is a side elevation view of the mechanism for locking a top mold section to a bottom mold section in a configuration where the top mold section is locked to the bottom mold section.
Figure 10:
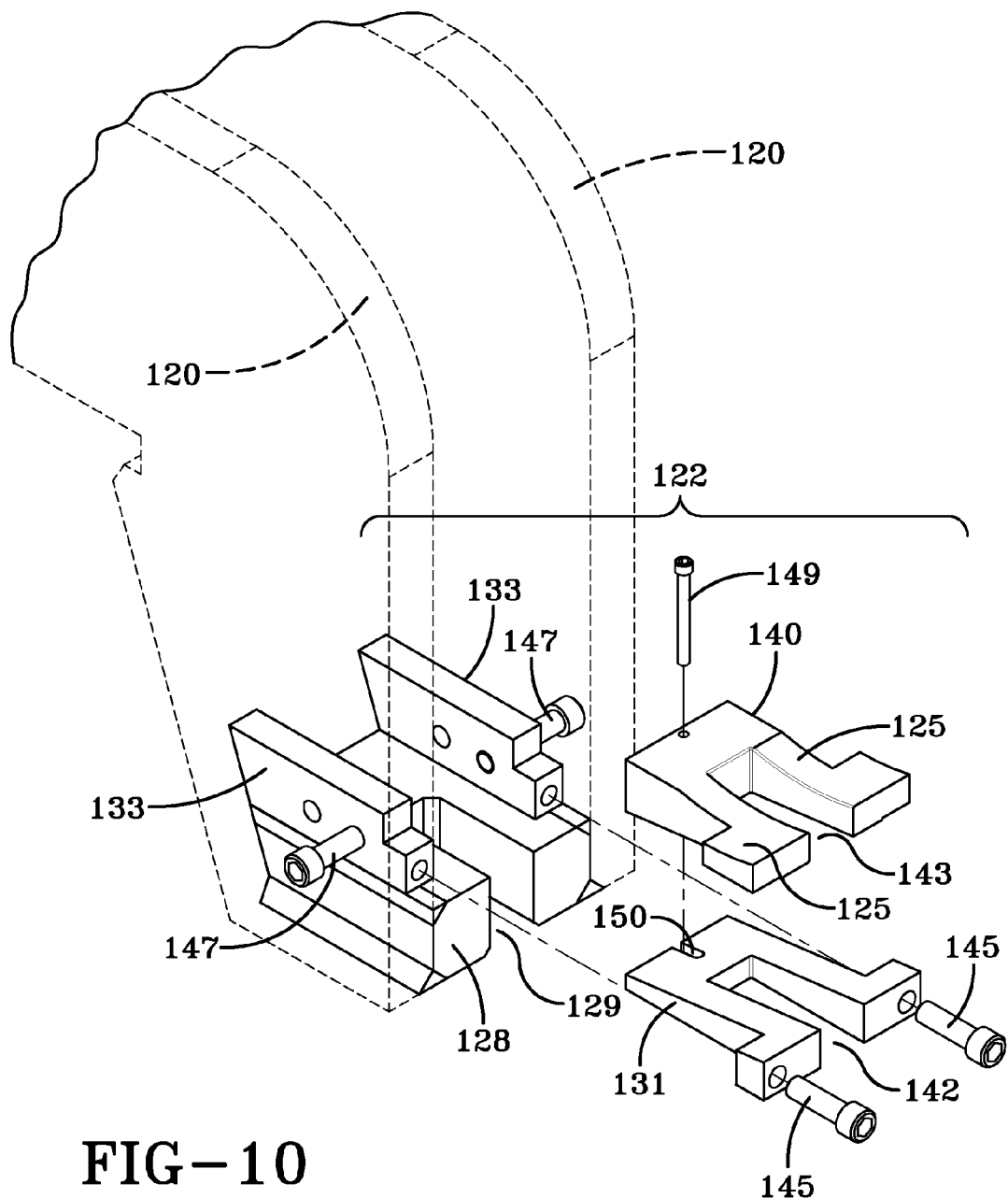
FIG. 10 is an exploded view of the portion of the adjustable mechanism for locking a top mold section to a bottom mold section that is fixed to the upper mold section.
Figure 11:
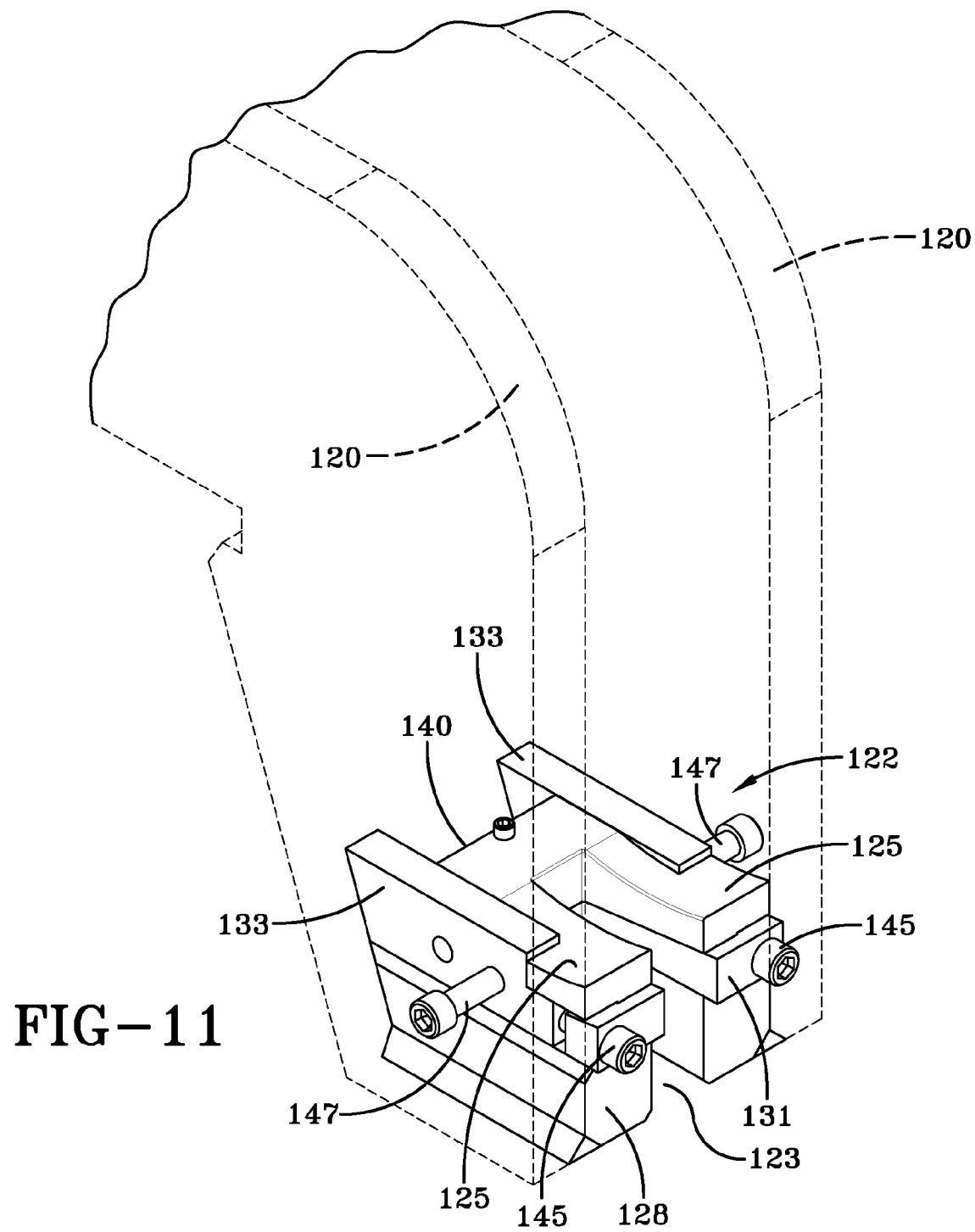
FIG. 11 is a perspective view of the portion of the adjustable mechanism for locking a top mold section to a bottom mold section that is fixed to the upper mold section.
Figure 12:
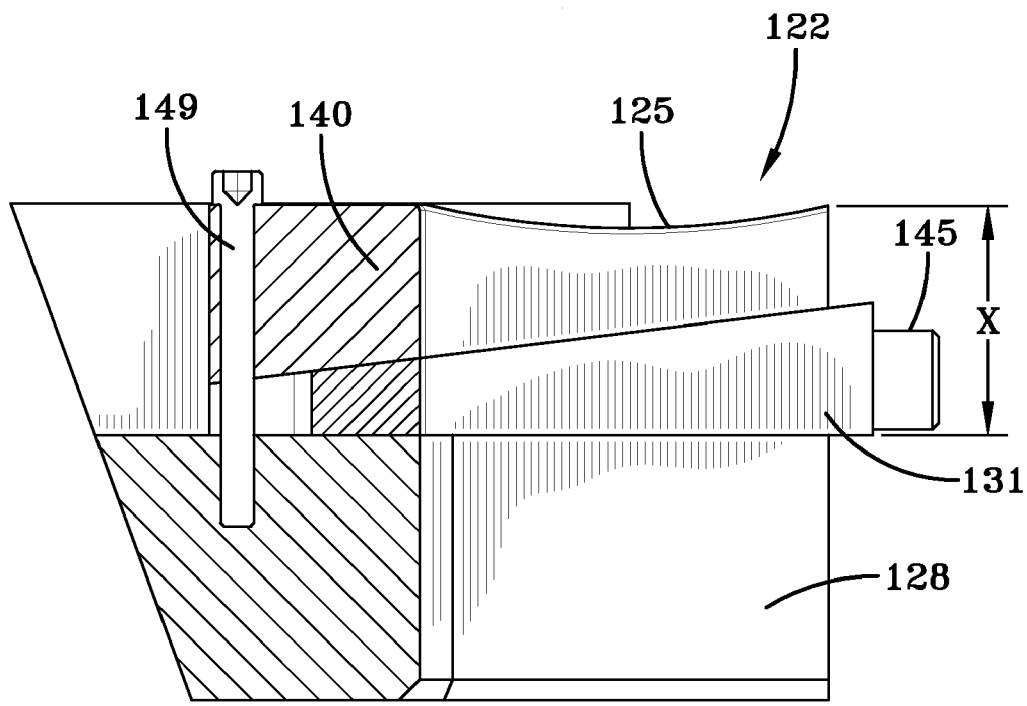
FIG. 12 is a cross-section of the portion of the mechanism for locking a top mold section to a bottom mold section that is fixed to the upper mold section with the components adjusted to a first configuration.
Figure 13:
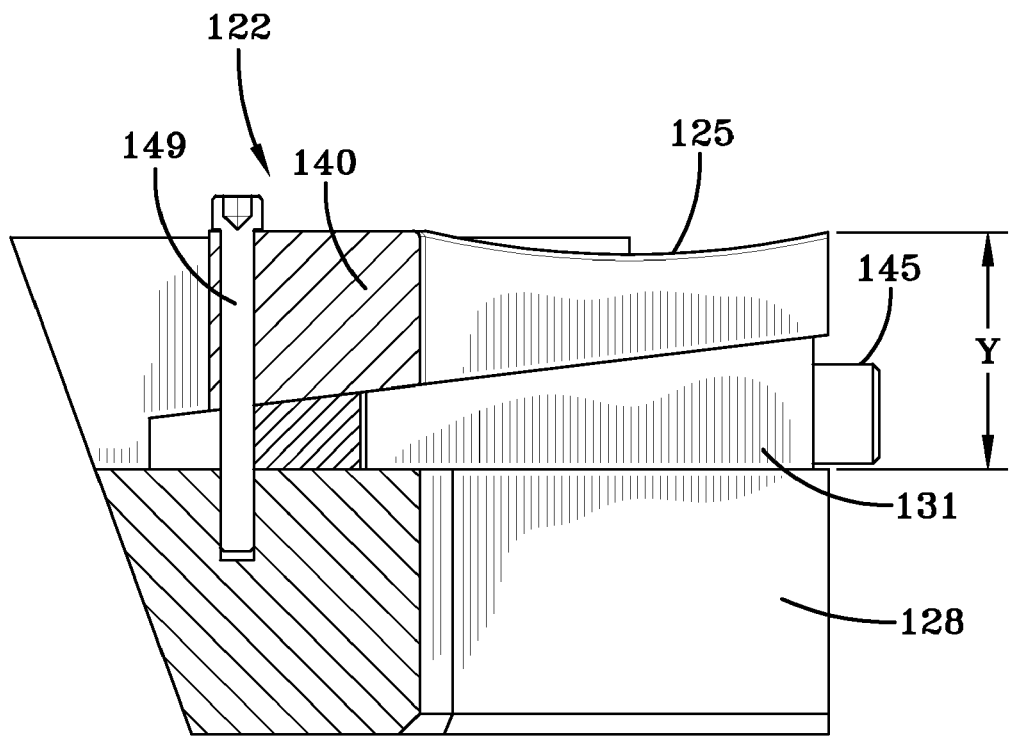
FIG. 13 is a cross-section of the portion of the mechanism for locking a top mold section to a bottom mold section that is fixed to the upper mold section with the components adjusted to a second configuration.

The mechanisms for locking the top mold section 71 to the bottom mold section 72 will now be described with reference to FIGS. 6, 7, 8, 9A, 9B and 9C. A hydraulic actuator 80 is disposed such that the cylinder is at least partially disposed below the bottom mold section with the piston rod 82 extending outwardly with respect to the bottom mold section, as best shown in FIGS. 9A, 9B and 9C. The hydraulic actuator is of the type generally referred to as a dual action hydraulic actuator. With reference to FIG. 8, the hydraulic actuator gets its power from a pressurized hydraulic fluid, which is typically an oil. The hydraulic actuator 80 includes a cylinder 81, a piston 83 disposed within the cylinder and a piston rod 82 having a first end fixed to the piston and extending through the cylinder to a second end located outside the cylinder. The piston divides the inside of the cylinder into two chambers 77, 97. A pump 85, shown schematically in FIG. 8, pumps a hydraulic fluid from a reservoir 86, shown schematically in FIG. 8, through a first hydraulic line 87 to a chamber 97 on the piston side of the cylinder to move the piston such that the piston rod extends further from the cylinder, while simultaneously hydraulic fluid is forced from a chamber 77 on the piston rod side of the cylinder through a second hydraulic line 88 back into the reservoir. The pump pumps hydraulic fluid from the reservoir through a third hydraulic line 89 to the chamber 77 on the piston rod side of the cylinder to move the piston such that the piston rod recedes further into the cylinder, while simultaneously hydraulic fluid is forced from a chamber 97 on the piston side of the cylinder through a fourth hydraulic line 90 back into the reservoir. Appropriate check valves are incorporated in the hydraulic system to prevent hydraulic fluid from flowing through the hydraulic lines when it is desired to maintain the position of the piston and piston rod for an extended period, such as during the vulcanization cycle for a tire. As will be further explained below, it is the maintaining of the position of the piston and piston rod for an extended time that locks the top and bottom mold sections in their respective positions during the tire vulcanizing process. It is understood that an apparatus according to the present invention may have a single pump and reservoir with lines running to each of the hydraulic cylinders for the plurality of mechanisms for locking the top mold section to the bottom mold section. Preferably a flow divider and header control all of the cylinders. However it is understood that if desired separate pumps and reservoirs may be used for the hydraulic cylinders of each of for the plurality of mechanisms for locking the top mold section to the bottom mold section. A further alternative is to provide multiple pumps and reservoirs, each serving only a portion of the plurality of mechanisms for locking the top mold section to the bottom mold section.

A closed end of the hydraulic cylinder is fixed via a base plate 91, brackets 92 and a pivot pin 93 to a base such as a factory floor or an appropriate member of a platform that supports the bottom mold section. The end 95 of the piston rod that is not fixed to the piston is disposed radially outwardly of the circumferentially extending outer wall of the bottom mold section. The second end 95 of the piston rod 82, that is to say the end of the piston rod that is not fixed to the piston, is fixed to a first end of an articulated linkage member 100, preferably in a pivotal manner. Put another way, the piston rod is fixed to the vertically lower end of the articulated linkage member in a pivotal manner. The articulated linkage member comprises a plurality of segments 101, 102, 103 fixed to one another by joints that allow next adjacent segments of the linkage member to rotate with respect to common pivot shafts 105, 106. A vertically highest segment 103 of the articulated linkage member is provided with a T-shaped projection 108 at a second end of the articulated linkage member. Preferably the T shaped projection 108 is integral with the vertically highest segment 103 of the articulated linkage member. While an exemplary embodiment of an articulated linkage member is shown in the drawings, it is understood that an articulated linkage member of any appropriate configuration that performs the functions disclosed herein, selected in accordance with good engineering practices, may be used in the practice of the present invention without deviating from the claimed invention.

A plurality of pairs of vertically extending brackets 110 are spaced apart around the circumference of the circumferentially extending outer wall 76 of the bottom mold section 72. As shown the brackets are each a portion of a support gusset that counters the pressure inside the mold due to pressure inside the tire.

The vertically lowest segment 101 of the articulated linkage member is disposed between one of the pairs of brackets. As shown the lowest segment 101 of the articulated linkage member comprises a pair of spaced apart parallel plates 112 that are held in a fixed spaced apart relationship by appropriate joining means. The other segments 102, 103 of the articulated linkage member may be single bars, some with forks to accommodate pivot pins, or pairs of spaced apart parallel plates that are held in a fixed spaced apart relationship by appropriate joining means. As shown each of the parallel plates 112 of the lowest segment of the articulated linkage member has a pair of legs 115, 116 that meet at a vertex. The vertically lowest segment of the articulated linkage member is held between the brackets by a pivot pin 118 that is located in the region of a first end of one of the legs 116 and extends through passages in one of the pairs of brackets and is secured in place by appropriate fasteners. The piston rod 82 is fixed to the vertically lowest segment 101 of the articulated linkage member in the region of a second end of the other leg 116, preferably by a means that allows the lowest segment of the articulated linkage member to pivot with respect to the end of the piston rod. The next adjacent segment 102 of the articulated linkage member is fixed to the vertically lowest segment 101 using a pivot pin 105 that extends through passages located in the region of the vertices of the parallel plates of the vertically lowest segment. The importance of this structure to the operation of the invention will be explained later.

Referring now to FIGS. 6-8 and 10-13, a number of pairs of vertically extending brackets 120, equal to the number of articulated linkage members, are spaced apart around the circumference of the circumferentially extending outer wall 74 of the top mold section 71. As shown the brackets are each a portion of a support gusset that counters the pressure inside the mold due to pressure inside the tire. An adjustable securing mechanism 122 is secured between each of the pairs of vertically extending brackets 120. The adjustable securing mechanism has a slot 123 therein that extends radially with respect to the top mold section for receiving the uppermost segment 103 of the articulated linkage member with the T-shaped locking projection 108 located above the slot. An upper surface of the adjustable securing mechanism has a concave surface 125 disposed on each side of the slot for receiving a complementary surface 126 of the T-shaped locking projection 108.

The operation of the new apparatus for vulcanizing at least a tread of a tire is best understood by referring to FIGS. 8, 9A, 9B and 9C. FIG. 8 is a perspective view of a mechanism for locking a top mold section to a bottom mold section. FIG. 9A is a side elevation view of the mechanism in a configuration where the top mold section is locked to the bottom mold section. FIG. 9B is a side elevation view of the mechanism in a configuration where the top mold section is not locked to the bottom mold section and the locking mechanism is either just about to complete the locking procedure or just beginning the unlocking procedure. FIG. 9C is a side elevation view of the mechanism in a configuration where the top mold section is not locked to the bottom mold section and the locking mechanism is either just beginning the locking procedure or completing the unlocking procedure.

The procedure for moving the T-shaped locking projection 108 into contact with the concave surfaces 125 of the adjustable securing mechanism 122 in preparation for starting the vulcanization process when the top and bottom mold sections are in the lower closed vulcanizing position is shown best by referring first to FIG. 9C, then FIG. 9B, and then FIG. 9A. The hydraulic actuator 80 is actuated by pumping fluid into the chamber 77 in the cylinder 81 on the piston rod side of the cylinder (while simultaneously hydraulic fluid is forced from a chamber 97 on the piston side of the cylinder into a reservoir) to move the piston in a direction towards the circumferentially extending outer wall 76 of the bottom mold section 72. This causes the articulated linkage member to move the T-shaped locking projection 108 vertically upward and in a direction towards the circumferentially extending outer wall 74 of the top mold section 71 to a position where the T-shaped locking projection is above and aligned with the concave surfaces 125 of the adjustable securing mechanism with the uppermost segment 103 extending through the slot 123 in the securing member. It can be seen in the drawings that the vertically lowest segment 101 of the articulated member effects the vertical movements of the T-shaped locking projection. It can further be seen in the drawings that a motion limiting device 107 associated with the vertically highest segment 103 of the articulated member limits the movement of the T-shaped locking projection towards and away from the circumferentially extending outer wall of the top mold section. Hydraulic fluid continues to be pumped into the chamber 77 in the cylinder on the piston rod side of the cylinder to continue to move the piston in a direction towards the circumferentially extending outer wall of the bottom mold section causing the articulated linkage member to move the T-shaped locking projection 108 vertically downward into contact with the concave surfaces 125 of the adjustable securing mechanism. With the complementary concave and convex mating surfaces 108, 125 adjacent to one another increased pressure inside the mold causes these mating surfaces to stay in contact and aligned with one another which causes the upper and lower mold sections to remain properly positioned. Once the mold is closed there is no need to maintain pressure in the chamber 77 in the cylinder on the piston rod side of the cylinder because the mold is then held closed by mechanical means. It is understood that the forces exerted by rubber from the tread portion of a very large tire during the vulcanization process may be forced into a space between the top and bottom mold sections, but the amount of flash formed by such rubber should be less than in prior art tire vulcanizing devices. It is understood that a factor in the amount of flash generated during the vulcanization process is the amount of deviation from the specified volume of tread rubber in the new or retreaded tire being vulcanized.

The vulcanization of a very large new tire or a very large retreaded tire can take several hours. After the vulcanization process is completed the T-shaped locking projection 108 can be moved away from contact with the concave surfaces 125 of the adjustable securing mechanism in preparation for separating the top and bottom mold sections and removing the tire from the bottom mold section.

In the prior art devices described above the flash located at the parting line of the upper and lower mold sections may exert forces that make it difficult and more time consuming to release the upper mold section from the lower mold section. The present invention improves the efficiency of the manufacturing process by reducing the time between vulcanizing successive tires. The procedure is best shown by referring first to FIG. 9A, then FIG. 9B, and then FIG. 9C. The hydraulic actuator 81 is actuated by pumping fluid into the chamber 97 in the cylinder on the piston side of the cylinder (while simultaneously hydraulic fluid is forced from a chamber 77 on the piston rod side of the cylinder into a reservoir) to move the piston in a direction away from the circumferentially extending outer wall 76 of the bottom mold section 72. This causes the articulated linkage member 100 to move the T-shaped locking projection 108 vertically upward, to relieve pressure created by flash at the junction of the upper and lower mold sections, and in a direction away from the circumferentially extending outer wall 74 of the top mold section 71 to a position where the T-shaped locking projection 108 is above the concave surfaces 125 of the adjustable securing mechanism. Hydraulic fluid continues to be pumped into the chamber in the cylinder on the piston side of the cylinder to continue to move the piston in a direction away from the circumferentially extending outer wall of the bottom mold section causing the articulated linkage member to move the T-shaped locking projection to a position where the T-shaped locking projection is no longer vertically aligned with the adjustable securing mechanism and is further from the circumferentially extending outer wall of the top mold section than the concave surfaces of the adjustable securing mechanism. The top mold section may thereafter be hoisted upwardly and away from the bottom mold section allowing the tire to be removed from the bottom mold section.

Inasmuch as an apparatus of the present invention used for vulcanizing very large tires will of necessity have a large circumference, it is desirable to provide a means for adjusting the vertical location of the upper surface of each of the adjustable securing mechanisms to obtain as uniform as is practical clamping forces around the circumference of the mating surfaces of the top and bottom mold sections. In the prior art tire vulcanizing devices discussed above the only way to attain this goal would be using a torque wrench for tightening each of the nuts on the swing bolts before beginning each vulcanization procedure. This is time consuming and labor intensive, which results in lower production efficiency and higher costs. An apparatus for vulcanizing at least a tread of a tire according to the present invention has a plurality of adjustable securing mechanisms 122 fixed to directly or indirectly to the circumferentially extending outer wall 74 of the top mold section 71 and circumferentially aligned with the T-shaped locking projections 108 of the mechanisms for locking the top mold section to the bottom mold section. It is understood that the adjustable securing mechanisms could be fixed directly to the circumferentially extending outer wall of the top mold section. However it is preferred that as shown in the drawings, especially with reference to FIGS. 10-13, that each adjustable securing mechanism be located between a pair of vertically extending brackets 120 that are fixed to the circumferentially extending outer wall 74 of the top mold section 71 by welding or during a casting process.

The securing mechanism includes a base plate 128 having a slot 129 therein that extends radially with respect to the top mold section for receiving the uppermost segment 103 of the articulated linkage member with the T-shaped locking projection 108 located above the slot. The base plate is fixed to the brackets 120 by welding. If desired the base plate may be additionally fixed to the circumferentially extending outer wall of the top mold section by welding. In any case the fixation of the base plate must be very robust to accommodate the large force that will be imparted to the base plate. A pair of spaced apart side receiving members 133 are located adjacent each of the brackets 120 on top of the base plate 128. An adjustable wedge member 131 is located on top of the base plate 128 interposed between the side members 133. A plate 140 for receiving the T-shaped projection 108 located at the top of the articulated linkage member rests on top of the adjustable wedge member 131 interposed between the side members 133. Both the adjustable wedge member and the plate for receiving the T-shaped projection located at the top of the articulated linkage member have slots 142,143 therein that are aligned with the slot 129 in the base plate when the adjustable securing mechanism is assembled. The plate for receiving the T-shaped projection located at the top of the articulated linkage member has a concave surface 125 disposed on each side of the slot for receiving a complementary convex surface 126 on the bottom side of the T-shaped locking projection. The vertical locations of the concave surfaces are adjustable as shown for example by dimensions X and Y in FIGS. 12 and 13 using height adjustment screws 145 that screw into the side members 133. The plate 140 for receiving the T-shaped projection located at the top of the articulated linkage member is secured in place with fixing screws 147 that extend horizontally through the brackets 120 and side members 133. A vertically oriented fixing screw 149 extends through a passage in the plate for receiving the T-shaped projection located at the top of the articulated linkage member and a slot 150 in the adjustable wedge member and screws into the base plate. It is anticipated that while occasional height adjustments may be required during the useful life of the vulcanizing apparatus, this adjustable securing mechanism will be much less labor intensive and time consuming than imparting a specified amount of torque on each of the nuts on the prior art swing bolt arrangements.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense. It is also to be understood that the following claims are intended to cover all of the generic and specific features of the invention herein described, and all statements of the scope of the invention which, as a matter of language, might be said to fall there between.

What is claimed is:

1. An apparatus for vulcanizing at least a tread of a tire comprising:
    a top mold section and a bottom mold section, said top mold section being vertically movable with respect to the bottom mold section from a raised open tire receiving position to a lower closed vulcanizing position;
    the top mold section and the bottom mold section each having a circumferentially extending outer wall,
    a plurality of mechanisms for locking the top mold section to the bottom mold section when the upper mold section is in the lower closed vulcanizing position are spaced apart around the circumferentially extending outer walls of the top and bottom mold sections, the mechanisms for locking the top mold section to the bottom mold section each comprising:
    (a) a hydraulic actuator comprising a cylinder, a piston disposed within the cylinder and a piston rod having a first end fixed to the piston and extending through the cylinder to a second end located outside the cylinder, the hydraulic actuator disposed such that the cylinder is at least partially disposed below the bottom mold section, the second end of the piston rod is located radially outward of the circumferentially extending outer wall of the bottom mold section and is movable towards and away from the circumferentially extending outer wall of the bottom mold section, the second end of the piston rod being fixed to a first end of an articulated linkage member comprising a plurality of segments connected to one another in a pivotal manner, a vertically highest segment of the articulated linkage member having a T-shaped locking projection at a second end of the articulated linkage member; and
    (b) an adjustable securing mechanism fixed directly or indirectly to the circumferentially extending outer wall of the top mold section and circumferentially aligned with the T-shaped locking projection, the securing mechanism having a slot therein that extends radially with respect to the top mold section for receiving the articulated linkage member with the T-shaped locking projection located above the slot, an upper surface of the adjustable securing mechanism having a concave surface disposed on each side of the slot for receiving a complementary surface of the T-shaped locking projection.

2. The apparatus for vulcanizing at least a tread of a tire according to claim 1 wherein the articulated linkage member comprises the plurality of segments fixed to one another by joints that allow next adjacent segments of the articulated linkage member to rotate with respect to a common pivot shaft.

3. The apparatus for vulcanizing at least a tread of a tire according to claim 1 wherein the T-shaped locking projection is moved vertically by the articulated linkage member to engage and disengage from the concave surfaces of the adjustable securing mechanism.

4. The apparatus for vulcanizing at least a tread of a tire according to claim 2 wherein the T-shaped locking projection is moved vertically by the articulated linkage member to engage and disengage from the concave surfaces of the adjustable securing mechanism.

5. The apparatus for vulcanizing at least a tread of a tire according to claim 1 wherein the T-shaped locking projection is moved into contact with the concave surfaces of the adjustable securing mechanism when the top and bottom mold sections are in the lower closed vulcanizing position by actuating the hydraulic actuator to move the piston rod in a direction towards the circumferentially extending outer wall of the bottom mold section causing the articulated linkage member to move the T-shaped locking projection vertically upward and in a direction towards the circumferentially extending outer wall of the top mold section to a position where the T-shaped locking projection is above and aligned with the concave surfaces of the adjustable securing mechanism, and continuing the movement of the piston rod in a direction towards the circumferentially extending outer wall of the bottom mold section causing the articulated linkage member to move the T-shaped locking projection vertically downward into contact with the concave surfaces of the adjustable securing mechanism.

6. The apparatus for vulcanizing at least a tread of a tire according to claim 2 wherein the T-shaped locking projection is moved into contact with the concave surfaces of the adjustable securing mechanism when the top and bottom mold sections are in the lower closed vulcanizing position by actuating the hydraulic actuator to move the piston rod in a direction towards the circumferentially extending outer wall of the bottom mold section causing the articulated linkage member to move the T-shaped locking projection vertically upward and in a direction towards the circumferentially extending outer wall of the top mold section to a position where the T-shaped locking projection is above and aligned with the concave surfaces of the adjustable securing mechanism, and continuing the movement of the piston rod in a direction towards the circumferentially extending outer wall of the bottom mold section causing the articulated linkage member to move the T-shaped locking projection vertically downward into contact with the concave surfaces of the adjustable securing mechanism.

7. The apparatus for vulcanizing at least a tread of a tire according to claim 1 wherein the T-shaped locking projection is moved away from contact with the concave surfaces of the adjustable securing mechanism when the top and bottom mold sections are in the lower closed vulcanizing position by actuating the hydraulic actuator to move the piston rod in a direction away from the circumferentially extending outer wall of the bottom mold section causing the articulated linkage member to move the T-shaped locking projection vertically upward and away from the circumferentially extending outer wall of the top mold section.

8. The apparatus for vulcanizing at least a tread of a tire according to claim 2 wherein the T-shaped locking projection is moved away from contact with the concave surfaces of the adjustable securing mechanism when the top and bottom mold sections are in the lower closed vulcanizing position by actuating the hydraulic actuator to move the piston rod in a direction away from the circumferentially extending outer wall of the bottom mold section causing the articulated linkage member to move the T-shaped locking projection first vertically upward and away from the circumferentially extending outer wall of the top mold section.

9. The apparatus for vulcanizing at least a tread of a tire according to claim 5 wherein the T-shaped locking projection is moved away from contact with the concave surfaces of the adjustable securing mechanism when the top and bottom mold sections are in the lower closed vulcanizing position by actuating the hydraulic actuator to move the piston rod in a direction away from the circumferentially extending outer wall of the bottom mold section causing the articulated linkage member to move the T-shaped locking projection first vertically upward and away from the circumferentially extending outer wall of the top mold section.

10. The apparatus for vulcanizing at least a tread of a tire according to claim 1 wherein adjustable securing mechanism includes a wedge and the vertical location of the upper surface of the adjustable securing mechanism having the concave surface disposed on each side of the slot for receiving the complementary surface of the T-shaped locking projection is adjustable by varying the location of the wedge.

11. The apparatus for vulcanizing at least a tread of a tire according to claim 1 further comprising a hydraulic power supply comprising a hydraulic pump and a fluid reservoir, the hydraulic power supply being in communication with the hydraulic actuator.

12. An apparatus for vulcanizing at least a tread of a tire comprising:
   a top mold section and a bottom mold section, said top mold section being vertically movable with respect to the bottom mold section from a raised open tire receiving position to a lower closed vulcanizing position;
   the top mold section and the bottom mold section each including an interior structure for imparting raised and depressed features to the tread of a tire, and both the top and bottom mold sections having a circumferentially extending outer wall, the circumferentially extending outer walls of both the top and bottom mold sections having a plurality of pairs of vertically extending mounting brackets spaced apart around the circumference of the circumferentially extending outer walls;
   a hydraulic power supply comprising a hydraulic pump and a fluid reservoir;
   a plurality of mechanisms for locking the top mold section to the bottom mold section when the upper mold section is in the lower closed vulcanizing position are spaced apart around the circumferentially extending outer walls of the top and bottom mold sections, the mechanisms for locking the top mold section to the bottom mold section each comprising:
   (a) a dual action hydraulic actuator in communication with the hydraulic power supply comprising a cylinder, a piston disposed within the cylinder and a piston rod having a first end fixed to the piston and extending through the cylinder to a second end located outside the cylinder, the dual action hydraulic actuator disposed such that the cylinder is at least partially disposed below the bottom mold section, the second end of the piston rod is located radially outward of the circumferentially extending outer wall of the bottom mold section and is movable towards and away from the circumferentially extending outer wall of the bottom mold section, the second end of the piston rod being fixed at a location between one of the pairs of mounting brackets on the circumferentially extending outer wall of the bottom mold segment to a first end of an articulated linkage member comprising a plurality of segments fixed to one another by joints that allow next adjacent segments of the articulated linkage member to rotate with respect to a common pivot shaft, a vertically highest segment of the articulated linkage member having a T-shaped locking projection at a second end of the articulated linkage member; and (b) an adjustable securing mechanism located between one of the pairs of mounting brackets on the circumferentially extending outer wall of the top mold section and circumferentially aligned with the T-shaped locking projection, the securing mechanism having a slot therein that extends radially with respect to the top mold section for receiving the articulated linkage member with the T-shaped locking projection located above the slot, an upper surface of the adjustable securing mechanism having a concave surface disposed on each side of the slot for receiving a complementary convex surface of the T-shaped locking projection.

13. The apparatus for vulcanizing at least a tread of a tire according to claim 12 wherein the T-shaped locking projection is moved into contact with the concave surfaces of the adjustable securing mechanism when the top and bottom mold sections are in the lower closed vulcanizing position by actuating the hydraulic actuator to move the piston rod in a direction towards the circumferentially extending outer wall of the bottom mold section causing the articulated linkage member to move the T-shaped locking projection vertically upward and in a direction towards the circumferentially extending outer wall of the top mold section to a position where the T-shaped locking projection is above and aligned with the concave surfaces of the adjustable securing mechanism, and continuing the movement of the piston rod in a direction towards the circumferentially extending outer wall of the bottom mold section causing the articulated linkage member to move the T-shaped locking projection vertically downward into contact with the concave surfaces of the adjustable securing mechanism.

14. The apparatus for vulcanizing at least a tread of a tire according to claim 12 wherein the T-shaped locking projection is moved away from contact with the concave surfaces of the adjustable securing mechanism when the top and bottom mold sections are in the lower closed vulcanizing position by actuating the hydraulic actuator to move the piston rod in a direction away from the circumferentially extending outer wall of the bottom mold section causing the articulated linkage member to move the T-shaped locking projection vertically upward and away from the circumferentially extending outer wall of the top mold section.

15. The apparatus for vulcanizing at least a tread of a tire according to claim 13 wherein the T-shaped locking projection is moved away from contact with the concave surfaces of the adjustable securing mechanism when the top and bottom mold sections are in the lower closed vulcanizing position by actuating the hydraulic actuator to move the piston rod in a direction away from the circumferentially extending outer wall of the bottom mold section causing the articulated linkage member to move the T-shaped locking projection first vertically upward and away from the circumferentially extending outer wall of the top mold section.

* * * * *